United States Patent
Scott et al.

(10) Patent No.: US 11,683,094 B1
(45) Date of Patent: *Jun. 20, 2023

(54) SATELLITE SYSTEM WITH NETWORKED GATEWAYS

(71) Applicant: Blue Digs LLC, Wilmington, DE (US)

(72) Inventors: James Scott, Manhattan Beach, CA (US); Scott Sullivan, Los Angeles, CA (US); Brian Grubel, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/487,491

(22) Filed: Sep. 28, 2021

Related U.S. Application Data

(63) Continuation of application No. 16/530,570, filed on Aug. 2, 2019, now Pat. No. 11,133,869, which is a continuation of application No. 15/672,211, filed on Aug. 8, 2017, now Pat. No. 10,374,713.

(60) Provisional application No. 62/523,076, filed on Jun. 21, 2017.

(51) Int. Cl.
    *H04B 10/2575* (2013.01)
    *H04W 88/16* (2009.01)
    *H04J 14/02* (2006.01)

(52) U.S. Cl.
    CPC ...... *H04B 10/25755* (2013.01); *H04W 88/16* (2013.01); *H04J 14/0204* (2013.01); *H04J 14/0205* (2013.01); *H04J 14/0215* (2013.01)

(58) Field of Classification Search
    CPC .............. H04B 10/25755; H04W 88/16; H04J 14/0204; H04J 14/0205; H04J 14/0215

USPC ......................................................... 398/115
    See application file for complete search history.

(56) References Cited

U.S. PATENT DOCUMENTS

| | | | |
|---|---|---|---|
| 5,710,652 A | 1/1998 | Bloom et al. | |
| 5,887,257 A | 3/1999 | Olds | |
| 6,327,523 B2 | 12/2001 | Cellier | |
| 6,519,773 B1 * | 2/2003 | Ahmed | H04N 21/4347 725/98 |
| 6,798,993 B1 | 9/2004 | Adams et al. | |
| 6,816,682 B1 | 11/2004 | Ionov et al. | |
| 7,120,139 B1 | 10/2006 | Kung et al. | |
| 9,973,984 B1 | 5/2018 | Hall et al. | |
| 10,374,713 B1 * | 8/2019 | Scott | H04W 88/16 |
| 11,133,869 B1 * | 9/2021 | Scott | H04B 10/25755 |
| 2003/0002100 A1 | 1/2003 | Izadpanah | |
| 2003/0079233 A1 | 4/2003 | Matthews et al. | |
| 2006/0209828 A1 | 9/2006 | Ng et al. | |
| 2008/0002981 A1 | 1/2008 | Malley et al. | |
| 2009/0161797 A1 | 6/2009 | Cowles et al. | |

(Continued)

*Primary Examiner* — Dalzid E Singh

(57) ABSTRACT

A satellite system may have a constellation of communications satellites that provides services to users with electronic devices such as portable electronic devices and home/office equipment. The satellites may support communications between the electronic devices of the users and gateways. Each gateway may have satellite transceiver circuitry that transmits and receives satellite signals. Each gateway may also have an optical add-drop multiplexer coupled to a fiber ring and radio-frequency-over-fiber circuitry coupled between the satellite transceiver circuitry and the optical add-drop multiplexer. A metropolitan point-of-presence may be in communication with the fiber ring and may have modems for centrally processing communications (received and transmitted in an intermediate frequency) in the satellite system.

20 Claims, 4 Drawing Sheets

(56) References Cited

U.S. PATENT DOCUMENTS

| | | |
|---|---|---|
| 2011/0169688 A1 | 7/2011 | Wyler |
| 2012/0018585 A1 | 1/2012 | Liu et al. |
| 2015/0270897 A1 | 9/2015 | Sackman et al. |
| 2016/0037434 A1 | 2/2016 | Gopal et al. |
| 2016/0164173 A1 | 6/2016 | Naym et al. |
| 2017/0288769 A1 | 10/2017 | Miller et al. |
| 2017/0294957 A1* | 10/2017 | Ravishankar ......... H04W 40/12 |
| 2017/0366251 A1* | 12/2017 | Ravishankar ...... H04B 7/18513 |
| 2018/0019809 A1 | 1/2018 | Hreha et al. |
| 2018/0227054 A1 | 8/2018 | Hreha |

\* cited by examiner

SATELLITE SYSTEM WITH NETWORKED GATEWAYS

This application is a continuation of U.S. patent application Ser. No. 16/530,570, filed Aug. 2, 2019, which is a continuation of U.S. patent application Ser. No. 15/672,211, filed Aug. 8, 2017, which claims the benefit of provisional patent application No. 62/523,076, filed on Jun. 21, 2017, each of which is hereby incorporated by reference herein in its entirety.

FIELD

This disclosure relates generally to satellite communications, including to a satellite system with interconnected gateways.

BACKGROUND

Communications systems often use satellites to convey data. Satellite-based systems allow information to be conveyed wirelessly over large distances, such as oceans and continents. For example, satellite-based systems can be used to convey media information to a large number of receivers over a large area, such as broadcast satellite networks. Further, satellite communications systems can be used to provide coverage where physical infrastructure has not been installed and/or to mobile devices that do not remain attached to an infrastructure resource. For example, satellite communications systems can provide communications capabilities to land-based devices such as handheld equipment and home or office equipment.

It can, however, be challenging to implement an effective satellite-based communications system. For example, satellite system resources may be deployed inefficiently, leading to elevated costs and/or suboptimal coverage.

SUMMARY

A satellite system may have a constellation of communications satellites to provide services to electronic devices (user equipment or UEs), such as portable electronic devices and home and office equipment. A network operations center may use gateways to communicate with the satellite constellation. The satellites may support communications between the electronic devices of the users and the gateways.

Each gateway may have satellite transceiver circuitry that transmits and receives satellite signals. Modems, however, may be centrally located at a metropolitan point-of-presence, e.g., in a bank of modems of one or more types. These modems may be shared among multiple gateways. Optical fibers may be used to link gateways in a metropolitan area with the modems at the metropolitan point-of-presence. The optical fibers may form a fiber ring.

Each gateway may also have an optical add-drop multiplexer coupled (communicatively) to the fiber ring. The metropolitan point-of-presence may also have an optical add-drop multiplexer coupled (communicatively) to the ring. During operation, satellite signals may be received by the satellite transceiver circuitry in the gateways. Radio-frequency-over-fiber circuitry in each gateway may be used in communicating with the metropolitan point-of-presence over the fiber ring, e.g., transmitting signals in an intermediate frequency. This configuration allows modem resources for multiple gateways to be pooled in the metropolitan point-of-presence, thereby enhancing scaling efficiency.

In some embodiments, traffic (receive and/or transmit) associated with gateways located in a metropolitan area can be communicated with a Metropolitan Point of Presence (MPoP) over an RF over Fiber (RFoF) ring. For example, multiple gateways can be connected to an MPoP over an RFoF ring, which can be implemented using, e.g., a dual counter-rotating ring architecture. The RF signals (e.g., V-band, Ka-band, etc.) received by the gateways can be routed, in an intermediate frequency, to the MPoP for processing, e.g., in a cloud-based modem bank with resources corresponding to all available types of traffic in the system. The digitized traffic can then be routed, e.g., using Ethernet-based switches/routers, to another point of presence and/or data network. The shared pool of modems can provide greater efficiency and scalability for system traffic, when compared to locating modems in each gateway.

DETAILED DESCRIPTION

The present disclosure, including the accompanying drawings, is illustrated by way of examples and not by way of limitation.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and/or other equipment. For example, wireless services can be provided to handheld devices, wearable devices, set-top boxes, media devices, mobile terminals, computing devices, sensors, etc.

Figure 1:
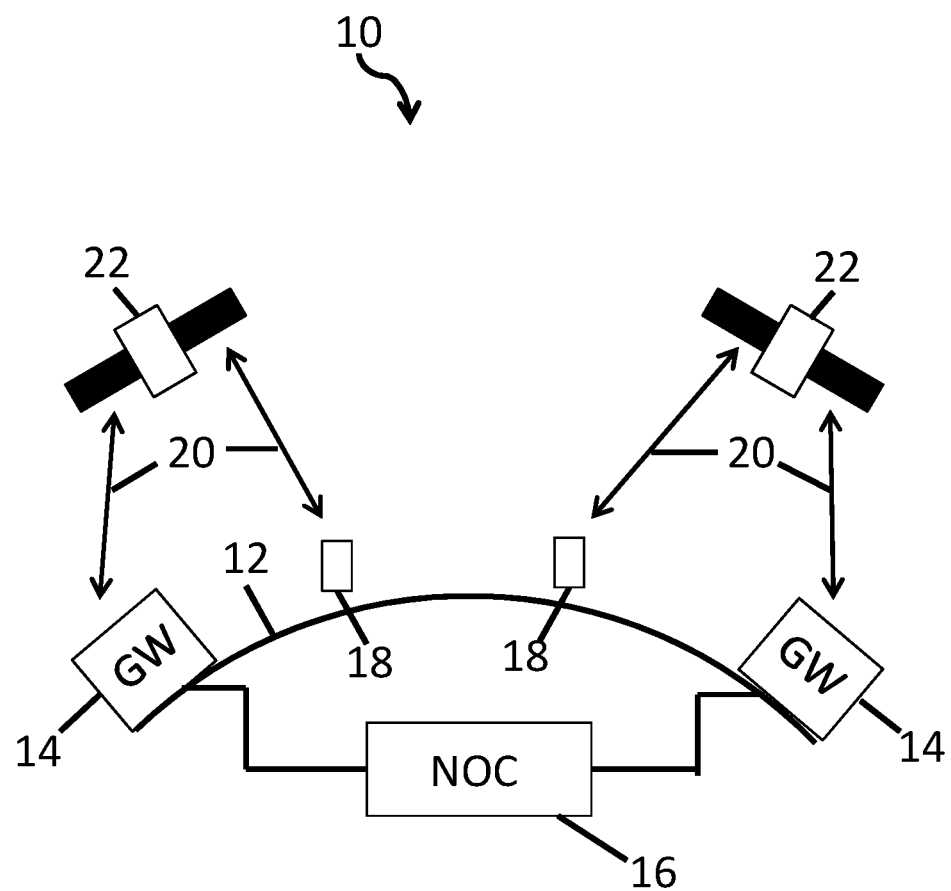
FIG. 1 presents a schematic diagram of an example of a communications system including satellites, in accordance with some embodiments.

An illustrative communications system with satellites is shown in FIG. 1. As shown in FIG. 1, communications system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of communications system 10 (e.g., 10-100, 1,000-10,000, more than 100, more than 1000, fewer than 10,000, etc.).

Satellites 22 may deliver wireless services to equipment such as electronic devices 18. Electronic devices 18 may include handheld devices and/or other mobile devices, such as cellular telephones, tablet computers, laptop computers, wristwatches and other wearable devices, mobile terminals, drones, robots, and other portable electronic devices. Electronic devices 18 may also include stationary (or less portable) equipment, such as set-top boxes (e.g., satellite receivers), routers, home base stations, televisions, desktop computers, ground terminals (e.g., gateways), and other electronic equipment (sometimes referred to as user equipment or user terminals). Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways, e.g., gateways 14. If desired, network operations can be managed using equipment at gateways 14, using equipment distributed throughout system 10, using multiple network operation centers 16 and/or other suitable equipment (e.g., servers or other control circuitry). The use of a network operations center such as NOC 16 of FIG. 1 is merely illustrative. In some configurations, clusters of gateways 14 and/or other equipment may share resources (e.g., gateways 14 in a metropolitan area may share a bank of modems located at one of the gateways 14 or other locations).

There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of communications system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

In general, population density is not uniform and varies across latitudes. However, satellite resources traditionally have been distributed across latitudes without distinguishing between less populated regions and more densely populated regions. As a result, a constellation organized in such manner requires more satellites (vehicles) to provide coverage over populated areas—thereby providing a surplus of coverage over less densely populated areas. However, efficiencies can be achieved by dividing a constellation of satellites into groups of multiple sub-constellations, each with an inclination and quantity of satellites sized to provide the bulk of its coverage to areas in which the population (e.g., actual population and/or user population) is dense. As a result, use of the constellation's resources can be enhanced as the number of satellites required to provide coverage and capacity is reduced, while excess capacity does not go unused over less populated areas. To ensure an efficient placement of on-orbit satellites, the constellation design can be implemented to match coverage-density with population-density (either actual or user), as closely as possible. For example, a geographic increase (e.g., peak) in population-density (or other such metric) identifies a service area by latitude. In at least some implementations, there can be multiple such service areas. Accordingly, a constellation can employ multiple sets of satellites with different orbital inclinations, e.g., Walker orbit inclinations, to approximate a match of coverage-density to population-density, facilitating an efficient placement of on-orbit satellites.

Figure 2:
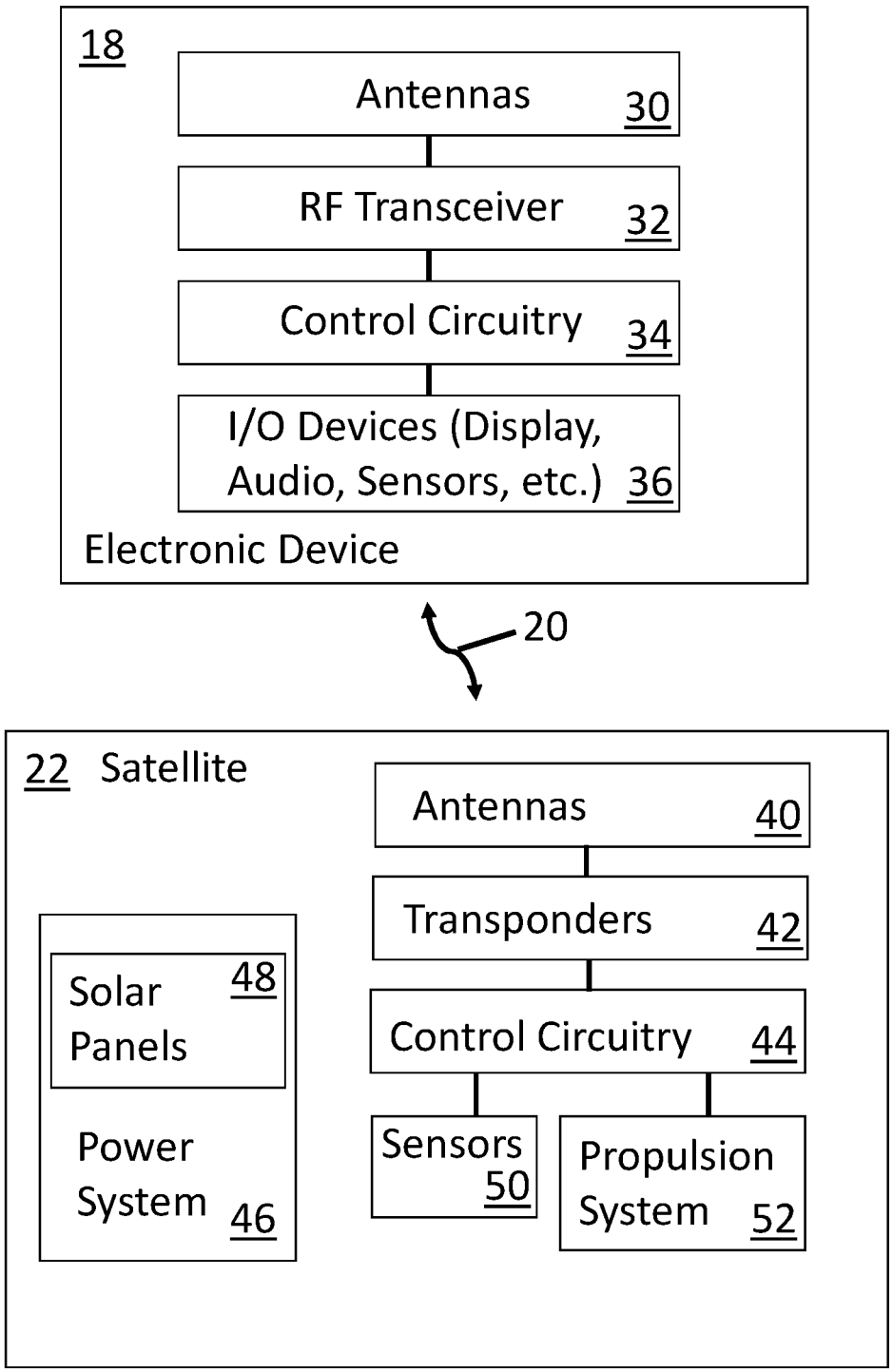
FIG. 2 presents a schematic diagram showing an example of an electronic device in communication with a communications satellite, in accordance with some embodiments.

FIG. 2 presents a schematic diagram of an illustrative electronic device 18 in communication, over a wireless communications link 20, with an illustrative satellite 22. As shown in FIG. 2, electronic device 18 may include one or more antennas 30. Antennas 30 may include any/all of monopoles, dipoles, and/or other types of antenna elements. Antennas 30 may, for example, include any/all of loop antennas, helical antennas, patch antennas, inverted-F antennas, Yagi antennas, slot antennas, horn antennas, cavity antennas, dish antennas, arrays of antennas (e.g., a phased antenna array that supports beam steering operations), and/or other suitable antennas. The antennas 30 can be implemented such that they are suitable for communication with one or more satellites using one or more satellite communications bands. Radio-frequency transceiver circuitry 32 may include radio-frequency receiver circuitry and/or radio-frequency transmitter circuitry that allows electronic device 18 to transmit and/or receive wireless signals over wireless communications link 20 using one or more antennas 30.

Electronic device 18 may also include control circuitry 34 and input-output devices 36. Control circuitry 34 may include storage, such as solid-state drives, random-access memory, and/or hard disk drives and other volatile and/or nonvolatile memory. Control circuitry 34 may also include one or more microcontrollers, microprocessors, digital signal processors, communications circuits with processors, application specific integrated circuits, programmable logic devices, field programmable gate arrays, and/or other processing circuitry. During operation, control circuitry 34 may run (or execute) code (instructions) that is stored in the storage of control circuitry 34 to implement desired functions for electronic device 18.

Control circuitry 34 may use input-output devices 36 to supply output to an interface configured to render output perceivable by a user and/or to external equipment, and may gather input received from a user and/or external source(s). Input-output devices 36 may include any/all of displays configured to present images, audio devices (e.g., speakers and/or microphones), sensors, controls, haptic actuators, and other components. For example, input-output devices 36 may include user input devices, such as one or more buttons, touch screens, sensors (e.g., accelerometers and/or gyroscopes), microphones for gathering voice commands, and/or other components for gathering input from a user. Further, input-output devices 36 may include speakers, light-emitting components, displays, vibrators and/or other haptic output devices, and other equipment for supplying a user with output. Input-output devices 36 may include sensors such as force sensors, position sensors, gyroscopes, magnetic sensors, accelerometers, capacitive touch sensors, proximity sensors, ambient light sensors, temperature sensors, moisture sensors, gas sensors, pressure sensors, and other sensors for gathering information representative of the environment in which electronic device 18 is located.

A satellite, such as satellite 22, may include one or more antennas 40. Antennas 40 may be based on any suitable type(s) of antenna elements (e.g., antenna elements such as any/all of monopoles or dipoles, loop antennas, helical antennas, patch antennas, inverted-F antennas, Yagi antennas, slot antennas, horn antennas, cavity antennas, etc.). Antennas 40 may be used in any suitable type(s) of antenna arrays (e.g., phased antenna arrays, fixed direct radiating arrays, deployable direct radiating antenna arrays, space fed arrays, reflector fed arrays, etc.). The antennas 40 can be implemented such that they are suitable for communication with one or more electronic devices 18, gateways 14, other satellites 22, or other communication devices/nodes using one or more satellite communications bands.

Satellite 22 may include transceiver circuitry that is communicatively coupled (directly or indirectly) to antennas 40. The transceiver circuitry may include one or more components, such as one or more transponders 42 for receiving uplink signals and transmitting downlink signals, e.g., over links 20. Further, control circuitry 44 may be used to control the operation of satellite 22. Control circuitry 44 may include storage and/or processing circuits, e.g., of the type used in control circuitry 34.

Power may be supplied to satellite 22 from power system 46. Power system 46 may include one or more solar panels 48 (or arrays of solar panels) for converting energy from the sun into electrical power. Power system 46 may include power regulator circuitry and batteries for storing electrical power generated by solar panels 48, and for distributing power to the components of satellite 22. Control circuitry 44 may receive information from one or more sensors 50. Further, control circuitry 44 may receive commands from NOC 16 and, using information from one or more sensors and/or received commands, may perform maintenance and/or control operations (e.g., software updates, operations related to the deployment and operation of solar panels 48, diagnostic routines, altitude adjustments and other orbital adjustments using propulsion system 52, etc.). Sensors 50 may include light-based sensors (e.g., infrared cameras, visible light cameras, etc.), lidar, radar, sensors that measure backscattered light and/or backscattered radio-frequency signals, temperature sensors, radiation sensors, accelerometers, gyroscopes, magnetic sensors, spectrometers, and/or other sensors. Sensors 50 may be used in performing remote sensing operations, fault detection, satellite positioning, and other operations.

Figure 3:
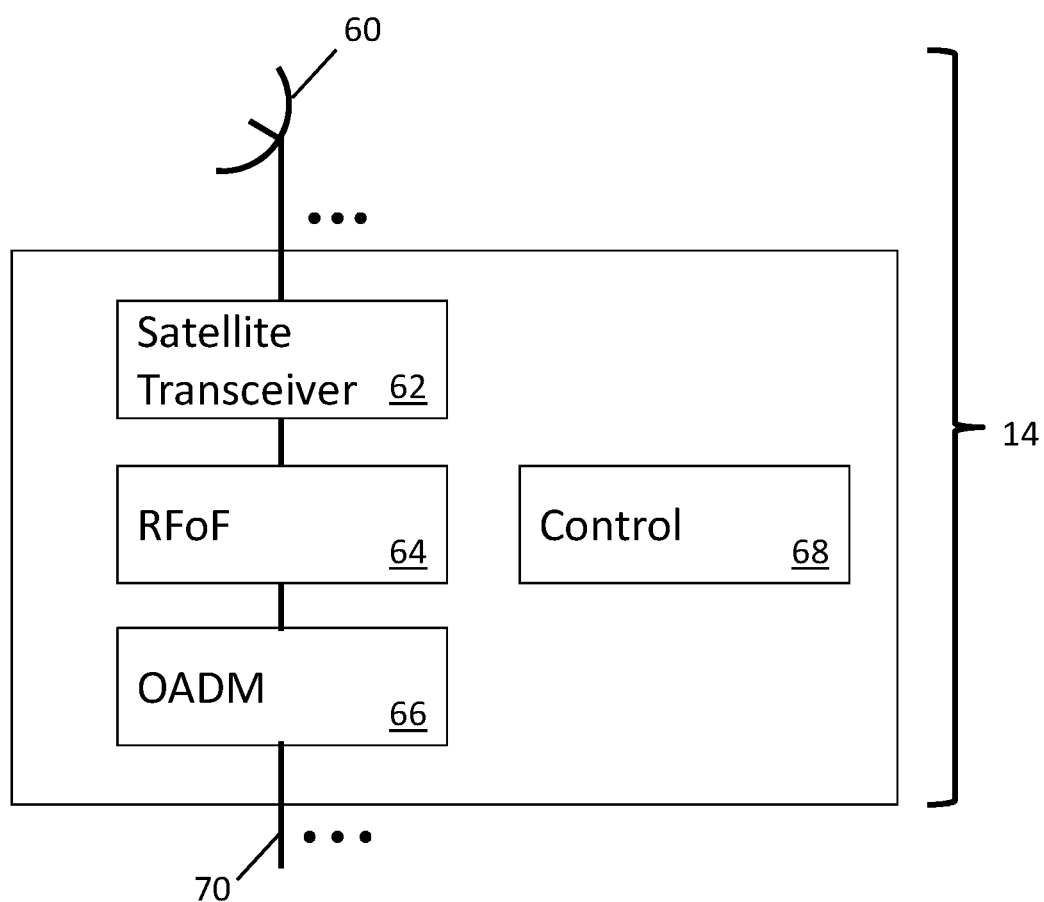
FIG. 3 presents a schematic diagram showing an example of a gateway, in accordance with some embodiments.

FIG. 3 is a diagram of an illustrative gateway (ground station) for system 10. As shown in FIG. 3, gateway 14 may include one or more satellite antennas, such as antenna(s) 60. Antennas 60 may receive signals from satellites 22 over links 20. Satellite signal transceiver circuitry 62 may include a satellite receiver configured to receive radio-frequency satellite signals from a satellite 22 and may include a satellite transmitter configured to transmit radio-frequency satellite signals to a satellite 22. The radio-frequency satellite signals may, for example, be V-band satellite signals, Ka-band signals, and/or satellite signals in other bands.

Radio-frequency over fiber (RFoF) circuitry 64 may be coupled (communicatively) between satellite transceiver circuitry 62 and optical add-drop multiplexer (OADM) 66. OADM 66 may be coupled (communicatively) to one or more optical fibers 70 (e.g., single-mode fibers). Fibers 70 may be formed in a ring to link gateway 14 with one or more other network resources (e.g., other gateways, a metropolitan point of presence, etc.). Fibers 70 may also be used in networks with topologies other than rings. The use of a fiber ring to interconnect gateways 14 is illustrative. Control circuitry 68 (e.g., one or more servers or other controller) may be used to perform control operations for gateway 14.

With one illustrative configuration, which may sometimes be described herein as an example, link 20 may include V-band traffic and/or Ka-band traffic. Link 20 may, for example, be operating at a frequency of about 40 GHz and about 10 GHz of this bandwidth (e.g., 5 GHz for each of two different satellite signal polarizations) may be used in carrying data.

Incoming signals from one or more satellites 22 may be received as radio-frequency signals and retransmitted on fibers 70 as light signals. For example, V-band and/or Ka-band signals may be received by antenna 60 and radio-frequency transceiver circuitry such as satellite signal transceiver circuitry 62. This, e.g., 10 GHz of data may be provided to an optical fiber network made up of one or more fibers 70 using RFoF circuitry 64 and OADM 66. RFoF circuitry 64 may receive the 10 GHz of radio-frequency satellite signals from transceiver 62 (e.g., as radio-frequency signals that have not been demodulated). The received signals may, if desired, be converted from the 40 GHz carrier signal used by satellites 22 to an intermediate frequency (e.g., a frequency of about 5 GHz for each polarization). The received radio-frequency satellite signals (e.g., the intermediate frequency versions of these radio-frequency signals) can be driven onto optical fibers 70 as light signals using RFoF circuitry 64 and the resources (e.g., lasers) of optical add drop multiplexer 66.

Outgoing signals for satellites 22 may be received as light signals from fibers 70 and retransmitted as radio-frequency signals to one or more satellites 22. For example, optical add-drop multiplexer 66 may receive light signals from fiber 70 and RFoF circuitry 64 may supply corresponding radio-frequency signals (e.g., intermediate frequency signals at 5 GHz per polarization) to satellite transceiver circuitry 62. Satellite transceiver circuitry 62 (e.g., V-band and/or Ka-band circuitry) may transmit the radio-frequency signals on a V-band and/or Ka-band radio-frequency carrier signal to one or more satellites 22.

In this way, satellite traffic may be conveyed between satellites 22 and a suitable network resource, such as a metropolitan point of presence, over two different physical carriers: 1) using V-band and/or Ka-band radio-frequency satellite signals in link 20 and 2) using light signals on fiber 70. The metropolitan point of presence may contain modem circuitry that converts incoming RFoF light signals from fiber 70 into digital data packets (e.g., internet protocol packets, etc.) and that converts outgoing digital data packets into RFoF light signals on fiber 70.

Optical fibers 70 and optical add-drop multiplexer 66 may carry any suitable number of wavelengths of light. For example, fibers 70 and multiplexer 66 may contain tunable-wavelength and/or fixed-wavelength lasers for supporting dense wavelength division multiplexing (DWDM) communications at 100-400 different wavelengths, 320 different wavelengths, more than 200 different wavelengths, or fewer than 500 different wavelengths. Fibers 70 may be arranged in one or more rings (e.g., dual counter-rotating rings) or may form fiber networks of other suitable topologies. Each gateway 14 may use its optical add-drop multiplexer 66 to add and/or drop channels at different wavelengths.

Figure 4:
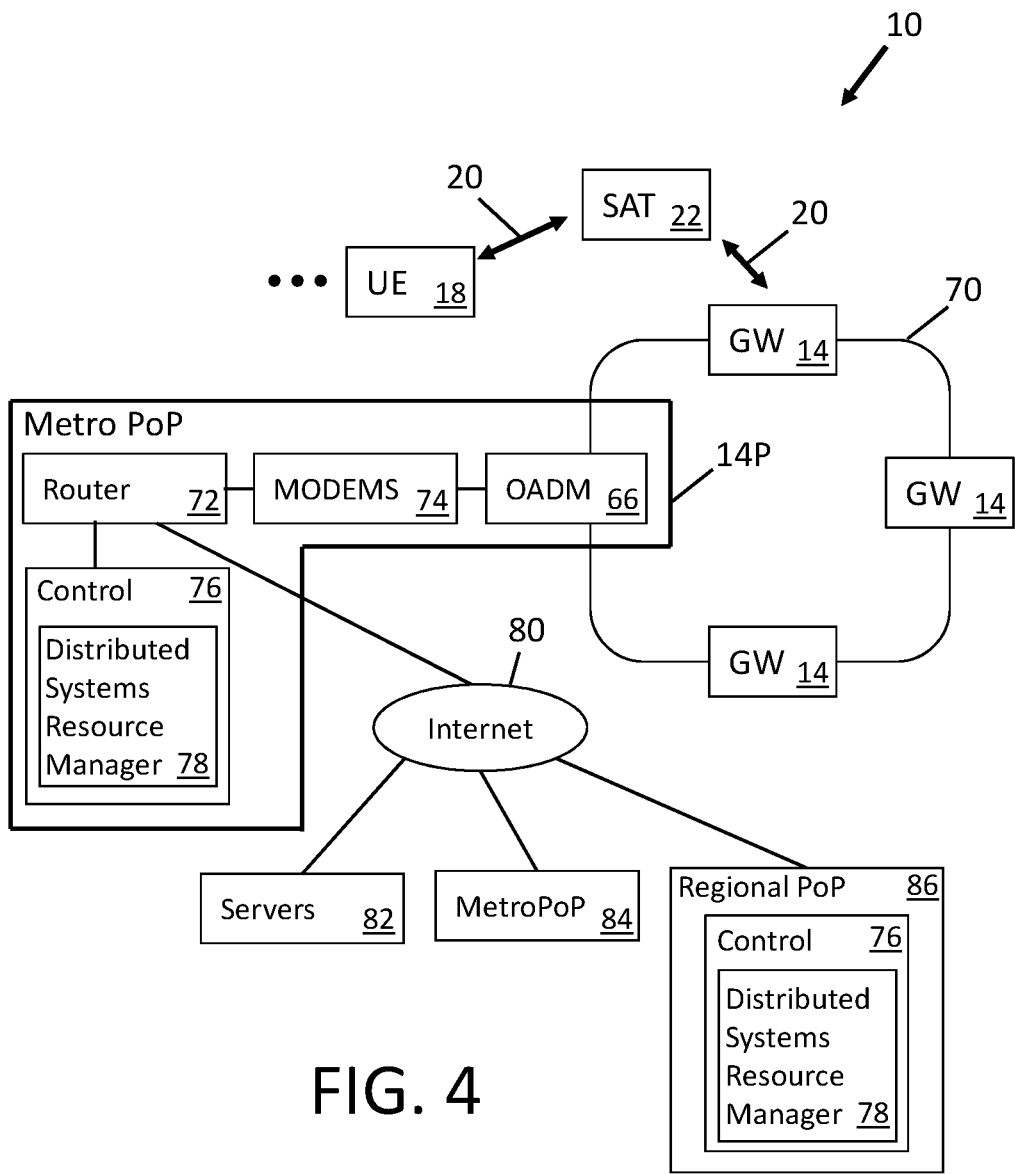
FIG. 4 presents a schematic diagram of an example satellite system with interconnected gateways, in accordance with some embodiments.

As shown in FIG. 4, fibers 70 may carry traffic for multiple gateways 14, each of which may have antennas 60 and other resources of the type shown in FIG. 3 for communicating with satellites 22 (e.g., low earth orbit satellites and/or other satellites) over links 20. There may be any suitable number of gateways 14 in a metropolitan area (e.g., 3-10, at least 2, at least 4, at least 6, fewer than 20, etc.) and these gateways 14 may be coupled to fiber 70 (or to similar fiber architectures) using a respective optical add-drop multiplexer 66.

Each metropolitan area in system 10 may include one or more metropolitan points of presence, such as metropolitan point of presence 14P. Point of presence 14P may contain circuitry such as modems 74 for demodulating incoming signals from fiber 70 into digital data (e.g., digital data packets such as internet protocol packets carried by the signal paths in metropolitan point of presence 14P and networks to which metropolitan point of presence 14P is linked). Modems 74 may include, e.g., radio access network cellular base station modems and/or digital video broadcast modems, supporting any of one or more protocols. During data reception operations, demodulated digital data from modems 74 may be supplied to router 72, which may distribute the data digitally. During data transmission operations, digital data from router 72 may be modulated using modems 74 and transmitted over fiber 70 using optical add-drop multiplexer 66.

Router 72 may supply digital data to control circuitry 76 (e.g., one or more servers). Control circuitry 76 may be configured to implement a distributed system resource manager 78. Resource manager 78 may be used in controlling the operation of metropolitan point of presence 14P and associated equipment in system 10. For example, resource manager 78 may manage link resources (e.g., capacity and carriers).

Router 72 may also couple (communicatively) metropolitan point of presence 14P to network 80 (e.g., the internet and/or other networks). Through network 80, users at equipment 18 may be provided with access to content such as content on servers 82. Content from servers 82 may, for example, be routed to modems 74 using router 72. This content may include web content retrieved by equipment 18, streaming multimedia content, broadcast content, and/or other content for equipment 18.

Modems 74 may include RFoF circuitry that allows modems 74 and optical add-drop multiplexers 74 to transmit information (e.g., content from servers 82 and/or other sources of packetized digital data) to a gateway 14 as radio-frequency modulated light signals on fiber 70. At the receiving gateway 14, OADM 66 and RFoF circuitry 64 may convert this radio-frequency-over-light signal to a radio-frequency electrical signal for satellite transceiver circuitry 62. Satellite transceiver circuitry 62 can then use the received signal from circuitry 64 to modulate a satellite carrier signal (e.g., a 40 GHz radio-frequency satellite signal or other suitable satellite signal) that is transmitted to satellite 22 (see, e.g., link 20).

If desired, router 72 may be coupled to other metropolitan points of presence 84 using network 80. Network 80 may also be used in connecting metropolitan point of presence 14P to a regional point of presence, such as regional point of presence 86 (which may be coupled to multiple metropolitan points of presence). Regional point of presence 86 may, if desired, receive network traffic from a network formed from interlinked regional points of presence (e.g., a national or global network of regional points of presence). Points of presence 84 and 86 may include servers or other control circuitry 76 on which distributed systems resource manager(s) 78 may be implemented.

Modems 74 of FIG. 4 may include scalable modem resources (e.g., modems configured using a scalable cloud-based radio-access network base station architecture). Using this type of arrangement, modems 74 may be able to terminate numerous sessions (e.g., sessions associated with numerous users at numerous respective electronic devices 18). Modems 74 of FIG. 4 may, for example, be used in handling at least 100,000 simultaneous sessions, at least 500,000 simultaneous sessions, at least 1 million simultaneous sessions, at least 3 million simultaneous sessions, fewer than 20 million simultaneous sessions, etc. The traffic aggregated at metropolitan point of presence 14P may exceed 0.1 terabits per second, may exceed 1 terabits per second, or may be less than 100 terabits per second.

In the illustrative configuration of FIG. 4, modems 74 are centralized at one or more metropolitan (and/or regional) points of presence and need not be present at gateways 14 (gateways 14 may be free of modems). Centralizing modems 74 at metropolitan point of presence 14P in this way allows modems 74 to be efficiently scaled (e.g., modem resources in system 10 may form a shared pool of resources that handles terabit-scale traffic associated with multiple gateways 14).

In accordance an embodiment, a system operable with satellites that support satellite communications with user equipment is provided that includes gateways configured to communicate with the satellites, a metropolitan point of presence that includes modems that are configured to communicate with the user equipment, and optical fiber configured to carry radio-frequency-over-fiber signals between the gateways and the modems.

In accordance with another embodiment, each gateway includes a satellite antenna, and satellite transceiver circuitry that is coupled to the satellite antenna and that is configured to transmit and receive Ka-band satellite signals with the satellite antenna.

In accordance with another embodiment, each gateway includes a satellite antenna, satellite transceiver circuitry that is coupled to the satellite antenna and that is configured to transmit and receive V-band satellite signals with the satellite antenna.

In accordance with another embodiment, each gateway includes a satellite antenna, a satellite transceiver configured to use the satellite antenna to transmit and receive satellite signals, an optical add-drop multiplexer coupled to the optical fiber, and a radio-frequency-over-fiber circuit that is configured to transmit received satellite signals from the satellite transceiver to the metropolitan point of presence over the optical fiber using the optical add-drop multiplexer.

In accordance with another embodiment, the optical add-drop multiplexer is configure to handle at least 200 different wavelengths of light each associated with a different wavelength division multiplexing channel.

In accordance with another embodiment, the satellite transceiver at each gateway includes a Ka-band satellite transceiver and that gateway does not have any modems.

In accordance with another embodiment, the satellite transceiver at each gateway includes a V-band satellite transceiver and that gateway does not have any modems.

In accordance with another embodiment, the optical fiber is configured in a ring.

In accordance with another embodiment, the metropolitan point of presence includes a router coupled to the modems.

In accordance with another embodiment, the system includes an additional point of presence that is coupled to the router through a network.

In accordance with an embodiment, a system operable with satellites that support satellite communications with user equipment, is provided that includes gateways configured to communicate with the satellites over V-band satellite communications links, a metropolitan point of presence including modems that are configured to handle communications with the user equipment through the gateways, and an optical fiber ring configured to carry radio-frequency-over-fiber signals between the gateways and the modems.

In accordance with another embodiment, each gateway includes a satellite antenna, a satellite transceiver configured to use the satellite antenna to transmit and receive satellite signals, an optical add-drop multiplexer coupled to the optical fiber ring, and a radio-frequency-over-fiber circuit that is configured to transmit received satellite signals from the satellite transceiver to the metropolitan point of presence over the optical fiber ring using the optical add-drop multiplexer.

In accordance with another embodiment, the metropolitan point of presence includes an optical add-drop multiplexer that is coupled to the optical fiber and that is configured to handle at least 100 different wavelengths of light each associated with a different wavelength division multiplexing channel.

In accordance with another embodiment, the metropolitan point of presence includes a router coupled to the modems.

In accordance with another embodiment, the system includes an additional metropolitan point of presence that is coupled to the router through a network.

In accordance with an embodiment, a system operable with satellites that support satellite communications with user equipment is provided that includes gateways configured to communicate with the satellites over Ka-band satellite communications links, a metropolitan point of presence including modems that are configured to handle communications with the user equipment through the gateways, and an optical fiber ring configured to carry radio-frequency-over-fiber signals between the gateways and the modems.

In accordance with another embodiment, each gateway includes a satellite antenna, a satellite transceiver configured to use the satellite antenna to transmit and receive satellite signals, an optical add-drop multiplexer coupled to the optical fiber ring, and a radio-frequency-over-fiber circuit that is configured to transmit received satellite signals from the satellite transceiver to the metropolitan point of presence over the optical fiber ring using the optical add-drop multiplexer.

In accordance with another embodiment, the metropolitan point of presence includes an optical add-drop multiplexer that is coupled to the optical fiber ring and that is configured to handle at least 200 different wavelengths of light each associated with a different wavelength division multiplexing channel.

In accordance with another embodiment, the metropolitan point of presence include a router coupled to the modems and the router is configured to receive internet content from servers and to provide the internet content to the modems.

In accordance with another embodiment, the system includes an additional metropolitan point of presence that is coupled to the router through a network.

The foregoing is merely illustrative and various modifications can be made to the described embodiments. The foregoing embodiments may be implemented individually or in any combination.

What is claimed is:
1. A satellite communications system comprising:
   a satellite constellation, including a first set of satellites at a first inclination and a second set of satellites at a second inclination that is different from the first inclination;

at least one gateway configured to communicate with the satellite constellation;

at least one modem centralized at a point of presence and configured to communicate with the first and second sets of satellites using the at least one gateway, wherein the point of presence comprises a router coupled to the at least one modem; and an additional point of presence coupled to the router through a network.

2. The satellite communications system of claim 1, wherein the first set of satellites comprises a first set of low earth orbit satellites at a first orbital altitude.

3. The satellite communications system of claim 2, wherein the second set of satellites comprises a second set of low earth orbit satellites at a second orbital altitude that is less than the first orbital altitude.

4. The satellite communications system of claim 3, wherein the first orbital altitude is greater than 500 km.

5. The satellite communications system of claim 4, wherein the second set of satellites comprises at least 1000 satellites.

6. The satellite communications system of claim 5, wherein there are fewer satellites in the first set of satellites than in the second set of satellites and wherein the first set of satellites comprises at least 100 satellites.

7. The satellite communications system of claim 1 wherein the first set of satellites comprises at least 1000 satellites and wherein the second set of satellites comprises 10-100 satellites.

8. The satellite communications system of claim 7 wherein the first set of satellites is at a lower orbital altitude than the second set of satellites.

9. A method of operating a satellite communications system comprising:

with at least one gateway, communicating with user equipment via a satellite constellation, wherein the satellite constellation includes a first set of satellites at a first orbital altitude and a first inclination and a second set of satellites at a second orbital altitude and a second inclination, wherein the second orbital altitude is less than the first orbital altitude and the second inclination is different from the first inclination;

with at least one modem centralized at a point of presence, communicating with the first and second sets of satellites using the at least one gateway, wherein the point of presence comprises a router coupled to the at least one modem; and with an additional point of presence, communicating with the router via a network.

10. The method of claim 9, wherein the second set of satellites comprises more satellites than the first set of satellites.

11. The method of 10, wherein the second set of satellites comprises at least 1000 satellites.

12. The method of claim 11, wherein the first set of satellites comprises 100 satellites.

13. The method of claim 9, wherein the first orbital altitude is greater than 500 km and less than 1500 km.

14. A satellite communications system comprising:

at least one gateway;

a point of presence communicably coupled to the at least one gateway, wherein the point of presence comprises at least one modem configured to communicate, via the at least one gateway, with first and second sets of satellites, the first set of satellites having low earth orbits with a first inclination and the second set of satellites having low earth orbits with a second inclination different from the first inclination, and wherein the point of presence comprises a router coupled to at least one modem; and an additional point of presence that is coupled to the router through a network.

15. The satellite communications system of claim 14, wherein the at least one modem is further configured to communicate, via the at least one gateway, with a third set of satellites having low earth orbits with a third inclination that is different from the first and second inclinations.

16. The satellite communications system of claim 14, wherein the satellites in the first set of satellites are at a first orbital altitude, the satellites in the second set of satellites are at a second orbital altitude that is less than the first orbital altitude, and the satellites in the third set of satellites are at a third orbital altitude that is less than the second orbital altitude.

17. The satellite communications system of claim 16, wherein the third orbital altitude is 650-750 km, the second orbital altitude is 550-650 km, and the third orbital altitude is 500-550 km.

18. The satellite communications system of claim 16, wherein there are more satellites in the third set of satellites than in the second set of satellites and wherein there are more satellites in the first set of satellites than in the second set of satellites.

19. The satellite communications system of claim 18, wherein the third set of satellites comprises at least 1000 satellites, the second set of satellites comprises 10-100 satellites, and the first set of satellites comprises at least 900 satellites.

20. The satellite communications system of claim 14 wherein the first set of satellites are at an orbital altitude greater than 600 km and less than 1500 km, the second set of satellites are at an orbital altitude greater than 500 km and less than 600 km, the second set of satellites comprises at least 500 satellites, and the first set of satellites comprises 10-100 satellites.

* * * * *

UNITED STATES PATENT AND TRADEMARK OFFICE
CERTIFICATE OF CORRECTION

| | | |
|---|---|---|
| PATENT NO. | : 11,683,094 B1 | |
| APPLICATION NO. | : 17/487491 | |
| DATED | : June 20, 2023 | |
| INVENTOR(S) | : James Scott, Scott Sullivan and Brian Grubel | |

It is certified that error appears in the above-identified patent and that said Letters Patent is hereby corrected as shown below:

In the Claims

Column 12, Line 33, "third orbital" should read -- first orbital --

Signed and Sealed this
Thirteenth Day of February, 2024

Katherine Kelly Vidal
*Director of the United States Patent and Trademark Office*